United States Patent
Waninger et al.

(10) Patent No.: US 9,267,706 B2
(45) Date of Patent: Feb. 23, 2016

(54) MODULAR COMMUNAL HEATING AND POWER STATION

(75) Inventors: Henrik Waninger, Hamburg (DE); Harald Roth, Bad Kreuznach (DE); Christian Appel, Rellingen (DE)

(73) Assignee: LichtBlick ZuhauseKraftwerk GmbH, Hamburg (DE)

(*) Notice: Subject to any disclaimer, the term of this patent is extended or adjusted under 35 U.S.C. 154(b) by 1200 days.

(21) Appl. No.: 12/719,187

(22) Filed: Mar. 8, 2010

(65) Prior Publication Data
US 2010/0224689 A1    Sep. 9, 2010

(30) Foreign Application Priority Data
Mar. 6, 2009    (DE) .......................... 10 2009 011 475

(51) Int. Cl.
F24D 3/02    (2006.01)
F24D 3/08    (2006.01)
F24D 19/10    (2006.01)
(Continued)

(52) U.S. Cl.
CPC    F24H 9/14 (2013.01); F01K 13/00 (2013.01); F24D 19/1048 (2013.01); F24H 9/02 (2013.01); F24H 9/06 (2013.01); F24H 9/142 (2013.01); F24H 9/148 (2013.01); F24D 2200/26 (2013.01); F24H 2240/06 (2013.01); (Continued)

(58) Field of Classification Search
CPC ........... F24H 9/142; F24H 9/148; F24H 9/06; F01K 13/00; Y02B 30/108
USPC ..... 237/12.1, 12.3 R, 12.3 A, 12.3 B, 12.3 C, 237/12.4, 13, 28, 5, 2 A
See application file for complete search history.

(56) References Cited

U.S. PATENT DOCUMENTS 3,025,407 A * 3/1962 Robson .......................... 290/1 R
3,782,628 A * 1/1974 Beaudet ................... 237/12.3 C
(Continued)

FOREIGN PATENT DOCUMENTS

DE    3116624    11/1982
DE    102005002831    8/2006
(Continued)

*Primary Examiner* — Steven B McAllister
*Assistant Examiner* — Jonathan Cotov
(74) *Attorney, Agent, or Firm* — White & Case LLP

(57) ABSTRACT

The present invention relates to a modular communal heating and power station, in particular for single-family dwellings and multiple-family dwellings. The communal heating and power station is characterized by a module design according to the invention.

Figure 1A:
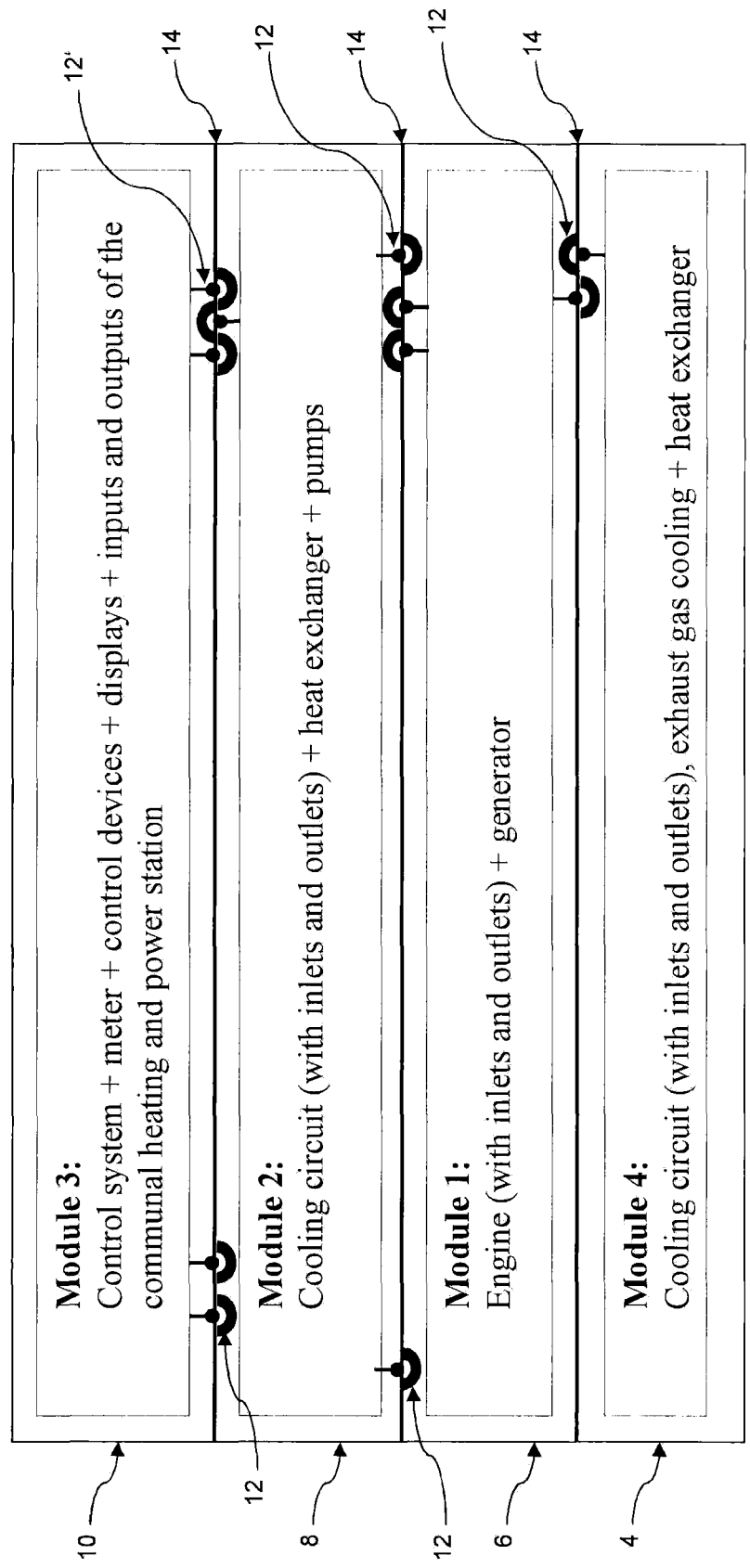

The invention comprises a modular combined heating and power station having at least the following components: an internal combustion engine, an electrical generator and at least one cooling circuit, comprising a modular design of the communal heating and power station, having at least: the internal combustion engine and/or the generator in a first module, a second module with at least elements of the at least one cooling circuit, in particular for the internal combustion engine and/or the generator, a control unit for at least one of the components, in particular for the internal combustion engine and/or the generator in a third module or elsewhere, elements of an exhaust gas installation and at least elements of the at least one cooling circuit, in particular of the exhaust gas installation, in a fourth module or elsewhere and connecting elements, to which the components, in particular components in different modules, can be electrically and/or hydraulically connected.

21 Claims, 8 Drawing Sheets

(51) Int. Cl.
*F24H 9/14* (2006.01)
*F24H 9/02* (2006.01)
*F24H 9/06* (2006.01)
*F01K 13/00* (2006.01)

(52) U.S. Cl.
CPC ............... *Y02B30/108* (2013.01); *Y02E 20/14* (2013.01); *Y10T 29/4935* (2015.01)

(56) References Cited

U.S. PATENT DOCUMENTS

| | | | |
|---|---|---|---|
| RE30,229 E | | 3/1980 | Berman et al. |
| 4,226,214 A | * | 10/1980 | Palazzetti ........................ 123/2 |
| 4,503,337 A | * | 3/1985 | Hafner et al. ................ 290/4 D |
| 4,527,071 A | | 7/1985 | Ausiello |
| 5,227,957 A | * | 7/1993 | Deters ..................... 361/679.32 |
| 5,535,944 A | * | 7/1996 | Knowles ......................... 237/13 |
| 5,626,103 A | * | 5/1997 | Haws et al. ............. 122/235.14 |
| 5,737,189 A | * | 4/1998 | Kammersgard et al. ...... 361/726 |
| 5,969,435 A | * | 10/1999 | Wilhelm ......................... 307/64 |
| 5,977,644 A | * | 11/1999 | Smith ........................... 290/1 B |
| 5,981,101 A | * | 11/1999 | Stone ........................... 429/100 |
| 6,053,418 A | * | 4/2000 | Guyer ........................... 237/12.1 |
| 6,094,130 A | * | 7/2000 | Uischner et al. ............. 340/333 |
| 6,250,080 B1 | * | 6/2001 | Shelor et al. ................... 60/618 |
| 6,329,907 B1 | * | 12/2001 | Uischner et al. ............. 340/333 |
| 6,351,715 B1 | * | 2/2002 | Ykema ........................... 702/62 |
| 6,441,505 B1 | * | 8/2002 | Poletti et al. .................. 290/1 A |
| 6,644,410 B1 | * | 11/2003 | Lindsey-Curran et al. ... 166/360 |
| 6,661,648 B2 | * | 12/2003 | Dayley ...................... 361/679.6 |
| 6,736,658 B2 | * | 5/2004 | Milan ........................... 439/189 |
| 6,938,828 B2 | * | 9/2005 | Waalders et al. ............... 237/70 |
| 7,011,214 B2 | * | 3/2006 | Brackmann et al. .......... 206/509 |
| 7,040,544 B2 | * | 5/2006 | Guyer ........................... 237/12.1 |
| 7,053,497 B2 | * | 5/2006 | Sodemann et al. ........... 290/1 A |
| 7,308,792 B2 | | 12/2007 | Alf et al. |
| 7,377,113 B2 | * | 5/2008 | Scalone ........................... 60/775 |
| 7,629,701 B2 | * | 12/2009 | Campanile et al. ............... 290/2 |
| 7,690,202 B2 | * | 4/2010 | Badeer et al. ..................... 60/728 |
| 7,960,943 B2 | * | 6/2011 | Gamboa et al. ............... 320/107 |
| 8,046,961 B1 | * | 11/2011 | Cutting et al. ................ 52/173.3 |
| 8,132,738 B2 | * | 3/2012 | Fraccaro ....................... 237/12.1 |
| 2004/0055225 A1 | | 3/2004 | Dirauf et al. |
| 2005/0222784 A1 | | 10/2005 | Tuff et al. |
| 2006/0043081 A1 | * | 3/2006 | Martin et al. ............... 219/130.1 |
| 2006/0119104 A1 | * | 6/2006 | Wall ................................... 290/2 |
| 2007/0258219 A1 | * | 11/2007 | Howes et al. .................. 361/728 |
| 2009/0058098 A1 | * | 3/2009 | Flynn ............................ 290/1 R |
| 2009/0284022 A1 | * | 11/2009 | Usselman et al. ........... 290/38 R |
| 2010/0072757 A1 | * | 3/2010 | Kealy et al. ................... 290/1 A |
| 2012/0125029 A1 | * | 5/2012 | Moreau ......................... 62/235.1 |
| 2012/0299401 A1 | * | 11/2012 | Prucher ........................... 310/43 |

FOREIGN PATENT DOCUMENTS

| | | |
|---|---|---|
| DE | 20 2007 008 712 | 10/2007 |
| EP | 1030123 | 11/2005 |
| EP | 1607586 | 12/2005 |
| FR | 2526484 | 11/1983 |
| WO | WO-02-42712 | 5/2002 |
| WO | WO-2008-039065 | 4/2008 |

* cited by examiner

MODULAR COMMUNAL HEATING AND POWER STATION

The present invention relates to a modular communal heating and power station, in particular for single-family and multiple-family dwellings. The communal heating and power station is characterized by a modular design according to the invention which makes it possible in particular to manufacture in a standardized manner and to efficiently integrate a communal heating and power station, in particular to transport it, to construct it, to connect it, and to commission it.

The expression communal heating and power station refers to relatively small engine-powered heating power stations whose engines are generally internal combustion engines. The waste heat from the engines that is created during operation is in this case used via a heat exchanger for heating purposes, while in contrast the mechanical energy is converted to electrical energy by a generator.

Communal heating and power stations are therefore in general used for simultaneous production of heat and electrical energy. In this case, a fuel, for example natural gas, heating oil, coal, biogas, vegetable oil or biodiesel, is converted into heat in an internal combustion engine, and into mechanical work which is in turn transformed into electrical energy in a generator.

In particular, communal heating and power stations are also known from DE 102005002831A1 and EP 1030123. Inter alia, the communal heating and power station in DE 102005002831A1 provides a switching apparatus which is used to feed the electrical energy that is generated into a public power supply system of a power supply organization. The subject matter of European Patent EP1030123 B1 also relates to a communal heating and power station. According to the invention, in this communal heating and power station, the heat from the exhaust gas is emitted via a second heat exchanger, and can thus be used for energy purposes.

The communal heating and power stations according to the prior art are generally assembled directly at the plant operating site, which means that long installation times must be accepted. Furthermore, the installation personnel have to have a high degree of specialist competence relating to many aspects, in particular specialist knowledge relating to heating construction, in the field of hydraulics, as well as specialist knowledge relating to the connection to the low-voltage power supply system, since communal heating and power stations generally have a multiplicity of individual components and peripherals. The communal heating and power stations, to the extent that they are finally installed in a completely alternative form, are generally very heavy, since all the components, in particular the engine, generator, pumps, heat exchangers and silencing elements, must be transported at the same time, and, at the same, time, stringent stiffness requirements are necessary, in particular for a base frame. In addition; finally assembled communal heating and power stations have a long and broad structure, thus necessitating complex transport, in particular without any barriers, and an appropriate space requirement at the installation site. Dedicated buildings are frequently planned for communal heating and power stations, and these are erected retrospectively around the already positioned communal heating and power station.

The apparatuses known from the prior art are unsuitable, or are at least highly complex and impracticable, for efficient integration in existing single-family and/or multiple-family dwellings, in particular for installation in basements. In general, in particular in the case of single-family dwellings, basements can be accessed only to a very restricted extent, as a result of which large, heavy and already finally assembled communal heating and power stations can be installed only with great difficulty. Alternatively, the communal heating and power stations would have to be assembled directly at the operating site.

The present invention is based on the object of providing a modular communal heating and power station which can be integrated particularly efficiently, in particular with reduced introduction effort and short construction times, in single-family or multiple-family dwellings and which, in particular, can easily be transported, installed, connected and commissioned.

This object is achieved by a modular communal heating and power station according to the invention having the features of claim 1. Preferred refinements of the invention are specified in the dependent claims.

The invention comprises a modular combined heating and power station having at least the following components: an internal combustion engine, an electrical generator and at least one cooling circuit, comprising a modular design of the communal heating and power station, having at least: the internal combustion engine and/or the generator in a first module, a second module with the at least one cooling circuit, in particular for the internal combustion engine and/or the generator, a control unit for at least one of the components, in particular the internal combustion engine and/or the generator in a third module, a fourth module with elements of an exhaust gas installation and with the at least one cooling circuit, in particular of the exhaust gas installation, and connecting elements, to which the components, in particular components in different modules, can be electrically and/or hydraulically connected.

A first module of the modular communal heating and power station has at least the internal combustion engine and/or the generator. In one alternative refinement, the first module may also have a multiplicity of internal combustion engines and/or generators. In a further alternative embodiment, the internal combustion engine is in the first module and the generator may be in another, in particular further, module. In particular, the generator may also be in one of the other modules. The generator may, however, also be in a fifth module. The internal combustion engine can preferably be operated using natural gas, or else alternative fuels such as heating oil, coal, biogas, vegetable oil or biodiesel are feasible. The generator may in particular generate an electrical power of up to 100 kW, preferably between 10 and 50 kW, and particularly preferably between 15 and 30 kW. Furthermore, the generator may have a cooling circuit, in particular a cooling circuit which can be connected to the cooling circuit of the internal combustion engine, preferably to a common cooling circuit together with the internal combustion engine. In one preferred refinement of the invention, the generator may be the starter for the internal combustion engine.

A second module of the communal heating and power station has the at least one cooling circuit, in particular for at least one component, preferably for the internal combustion engine and/or the generator. The cooling circuit for the communal heating and power station according to the invention may have means which can transmit the heat from the communal heating and power station, in particular the heat from the internal combustion engine and/or the generator, in particular to a gaseous or a fluid medium, in particular water, oil or cooling liquid. According to the invention, the cooling circuit according to the invention may have a heat pump and/or a heat exchanger, preferably a plate-type heat exchanger and/or a spiral heat exchanger, and/or a tube heat exchanger, in particular a tube-bundle heat exchanger.

A third module of the communal heating and power station has at least one control unit for at least one component, preferably for an internal combustion engine and/or a generator. The control system can preferably be adapted such that, in particular, the entire communal heating and power station and/or a heating installation, which in particular is connected to the communal heating and power station, can be controlled.

The cooling circuit, in particular that for the exhaust gas installation, may have heat exchangers which can transmit the heat from the communal heating and power station, in particular the heat from the exhaust gas from the internal combustion engine, in particular to a gaseous or a fluid medium, in particular water, oil, air, cooling liquid or other liquids. According to the invention, a cooling circuit according to the invention may have a heat pump and/or a heat exchanger, preferably a plate-type heat exchanger and/or a spiral heat exchanger and/or a tube heat exchanger.

Furthermore, the fourth module may have at least one oil tank and/or oil reservoir extension for internal combustion engine cooling, which in particular can be connected by means of connecting elements to the internal combustion engine. In addition, the fourth module may have at least one exhaust-gas connecting stub. An exhaust-gas connecting stub such as this may in particular be adapted such that the exhaust oases from the internal combustion engine, in particular after they have emitted heat, can escape, to be precise in particular to a cooling circuit, preferably to calorific-value technique exchanger, or via a chimney.

The modular construction of a communal heating and power station is also according to the invention. The modular construction of the communal heating and power station has at least: the internal combustion engine and/or the generator in a first module, a second module with the at least one cooling circuit, in particular for the internal combustion engine and/or the generator, a control unit for at least one of the components, in particular for the internal combustion engine and/or the generator in a third module, a fourth module with elements of an exhaust gas installation and the at least one cooling circuit, in particular the exhaust gas installation, and connecting elements to which the components, in particular components of different modules, can be electrically and/or hydraulically connected.

Preferably and in particular, prefabricated modules of a communal heating and power station can be connected to one another by simple connecting elements, in particular quick-action connecting elements, preferably directly at the operating site, and can preferably be connected quickly. The components and/or the modules can be connected to one another by means of the connecting elements. The connecting elements can be connected quickly, in particular can be plugged and/or screwed into one another. Furthermore, the connecting elements may be plug connectors, in particular electrical plug connectors for electricity transmission and/or data transmission, and/or coupling elements, in particular for gaseous or fluid media, preferably quick-release coupling elements. Further coupling elements may be: pneumatic couplings and/or hydraulic couplings. In addition, the coupling elements may be monocouplings or multicouplings and/or may have additional stop apparatuses, in particular so-called clean-break couplings.

The connecting elements, in particular the plug connectors, can particularly advantageously be designed such that a connection, in particular a data link and/or electrical connection, is created between the individual components and/or modules. In one alternative embodiment, the connecting elements may have protection elements, in particular mechanical protection devices, preferably force-fitting and/or interlocking and/or integral protection devices, in particular also screw protection devices, and/or electrical protection devices. In addition, connecting elements may have additional sealing and/or insulation elements, in particular against moisture and/or dust and/or electricity.

Alternatively, the connecting elements according to the invention may, however, also be made flexible, preferably by the use of extension elements, in particular by the use of cables and/or hoses, in particular armored hoses and/or reinforced plastic hoses.

According to the invention, the modules may be mounted or arranged adjacent to one another or one above the other. The modules according to the invention may have frame structures, in particular tube frames, or other means to provide robustness. Particularly preferably, the modules may have contact surfaces, in particular installation surfaces, which are designed such that the contact between two modules has a connection, preferably an interlocking and/or force-fitting connection. The contact surfaces between the modules can preferably be designed such that the modules grip one another. In one particularly preferred embodiment, the contact surfaces may have the connecting elements, in particular plug connectors and/or coupling elements, and in particular the contact surfaces may have multiple couplings and/or electrical plug connectors. The modules can be designed such that they each have at least one connecting element which is complementary to the directly adjacent connecting module. In one preferred embodiment, the modules according to the invention may have installation profiles, in particular stand feet and/or mounting rails. The installation profiles may be used in particular for vibration decoupling between the individual modules and/or for the entire installation. A vibration-decoupling covering, in particular a ground covering, can provide vibration decoupling, in particular between the modules and/or in particular between the fourth module and the ground surface.

The respective modules can particularly advantageously be prefabricated, particularly in the production process itself. The respective modules, in particular the various communal heating and power stations, can preferably be joined together essentially in the same way or identically, and/or may have the same components. It is particularly advantageous for the respective modules to be constructed in a standardized manner in the factory. The modules according to the invention are preferably designed such that all the major components, in particular an internal combustion engine and an electrical generator, and at least one cooling circuit, are contained in at least one of the modules. Furthermore, a central control unit, in particular for the internal combustion engine and/or the generator, display and control elements, and at least one meter for the energy to be transmitted, in particular for the electrical energy and/or the heat energy, and at least one measurement device may be provided in at least one of the modules, preferably in one and only one module, and particularly preferably only in the third module according to the invention. All of the modules in a module communal heating and power station according to the invention together have at least one internal combustion engine, at least one electrical generator and at least one cooling circuit. In addition, one of the modules, in particular the first or the third module, may have a voltage converter.

The modules of the modular communal heating and power station according to the invention can be designed such that one module, in particular each module, is no heavier than 300 kg, in particular no heavier than 200 kg, and preferably no heavier than 180 kg, and/or such that the space required to install the modular communal heating and power station, in particular excluding any additional maintenance area, is less than 4 m², in particular less than 2 m², and preferably less than 1 m². The modules according to the invention can preferably be arranged such that the modules are positioned one above the other and/or, interleaved in one another, such that they can form a common communal heating and power station unit. The interfaces of the communal heating and power station unit can preferably be adapted such that the modules are no heavier than a predetermined weight, in particular no heavier than 200 kg and/or the base area is no larger than a predetermined area, and in particular is no larger than 2 m², and preferably less than 1 m². Furthermore, the interfaces of the communal heating and power station unit can be designed such that complementary connecting elements are essentially opposite and grip one another, and/or can be connected by extension elements, in particular can be connected quickly. This advantageously means that the modules can be connected to one another, in particular in a standardized manner. In particular, a refinement according to the invention such as this is advantageous because it is possible to reduce the introduction effort and the installation time.

The modular communal heating and power station system according to the invention may have the advantage that the modules of the same type, are designed such that they can be replaced, in particular, however, also by alternative components of the same type, in particular by alternative motors or by alternative generators. One module can therefore be replaced by a different module of the same type, in particular a first module can be replaced by an identical or alternative first module and/or a third module can be replaced by an identical or alternative module. Alternatively, additional modules can also be added to a modular communal heating and power station according to the invention.

According to the invention, the modular communal heating and power station may have a multiplicity of identical components, in particular internal combustion engines and/or generators. In one alternative embodiment, the communal heating and power station according to the invention may also have a multiplicity of identical modules, in particular of first modules (in the internal combustion engine and/or the generator) and/or second modules (having at least one cooling circuit). In one alternative embodiment, it may also be particularly advantageous for a module to have essentially all the components, in particular all the peripheral elements as well. It may be particularly advantageous to integrate the peripheral elements in a communal heating and power station according to the invention. This is particularly advantageous because it is possible to reduce the introduction effort and the installation times and/or the construction of the installation can be substantially standardized. The integration of previous peripheral parts and/or components which until now have generally been fitted to communal heating and power stations according to the prior art outside the communal heating and power station unit, in particular of a heat amount meter, a control system for the communal heating and power station and/or the entire heating system, in particular also a heating control system for a plurality of optional heating circuits, electrical distribution, a communication unit, a mixer group for a heating circuit, in particular also a mixer group for hot drinking water and/or for priority control of the hot drinking water preparation, and/or a storage booster pump and/or a circuit for engine preheating by means of heating water and/or a billing-relevant electricity meter and/or a device for power supply system monitoring with associated switching members (ENS), allows a communal heating and power station to be manufactured in particular in a standardized form, and preferably in the factory.

A further object of the modular communal heating and power station may be to advantageously move the integration effort into the manufacturer's factory, thus in particular reducing the introduction times to the operating site and/or making the introduction of the communal heating and power station particularly efficient. In particular, this can be achieved by the integration of as many previous peripheral components as possible. One object may also be to allow standardization, in particular in the factory, and preferably also automation, of the manufacture of the communal heating and power stations. Such standardized manufacture of the modules, preferably in the factory, is particularly advantageous since, in particular, this also makes it possible to reduce the installation effort at the operating site (installation point). One particular advantage of the modular communal heating and power station according to the invention may be that it is possible to reduce the individual effort for installation at the installation point. In particular, the continuously new conditions of the installation point frequently result in high introduction costs for convention communal heating and power stations according to the prior art.

In particular, in one particularly preferred embodiment, most of the previous peripheral components, and preferably all the previous peripheral components, are integrated in the modular communal heating and power station. In particular, a billing-relevant electricity meter can also be integrated in the communal heating and power station.

Furthermore, the particularly advantageous reduction in the introduction effort, in particular because of the preassembled modules and/or components which previously belonged to the peripheral, allows calculation confidence for the introduction effort and/or for the investment costs.

In one preferred embodiment, the following components which are generally located outside the communal heating and power station in the case of a communal heating and power station according to the prior art, can be at least partially, and preferably completely, integrated in the modular communal heating and power station: a heat amount meter, a control system for the communal heating and power station and/or for the entire heating system, in particular also a heating control system for a plurality of optional heating circuits, electrical distribution, a communication unit, a mixer group for a heating circuit, in particular also a mixer group for hot drinking water and/or for priority control of the hot drinking water preparation, a storage booster pump, a circuit for engine preheating by means of heating water, a device for power supply system monitoring with associated switching members (ENS), and a billing-relevant electricity meter.

The invention also covers a method for construction of a communal heating and power station, in particular using the modules according to the invention. In the case of the method according to the invention, the components and/or the modules can be connected by essentially opposite, complementary connecting elements, in particular quick-action connecting elements, and in particular can be plugged and/or screwed into one another. In one advantageous refinement of the method, each of the modules can be prefabricated. Preferably, only the connecting elements of the modules need be connected to one another for the construction of the operating site. In one particularly advantageous refinement of the method according to the invention, the modules can be positioned one above the other, and/or may grip one another and/or may form a common unit.

A further object of the present invention is to provide, in particular standardized, communal heating and power station modules. As a result of the configuration of the modules according to the invention and because of the modular design, it may be particularly advantageous that the construction of a modular communal heating and power station can also at least partially be standardized, and/or can be made particularly efficient. Advantageous standardized introduction of the communal heating and power station and/or standardized construction of the communal heating and power station can be achieved by flexible hose lines, in particular armored hose lines, preferably for the hydraulic lines and/or for the gas line as well, and/or by standardized pipelines, preferably flexible pipelines and/or by the use of adapters.

Figure 1B:
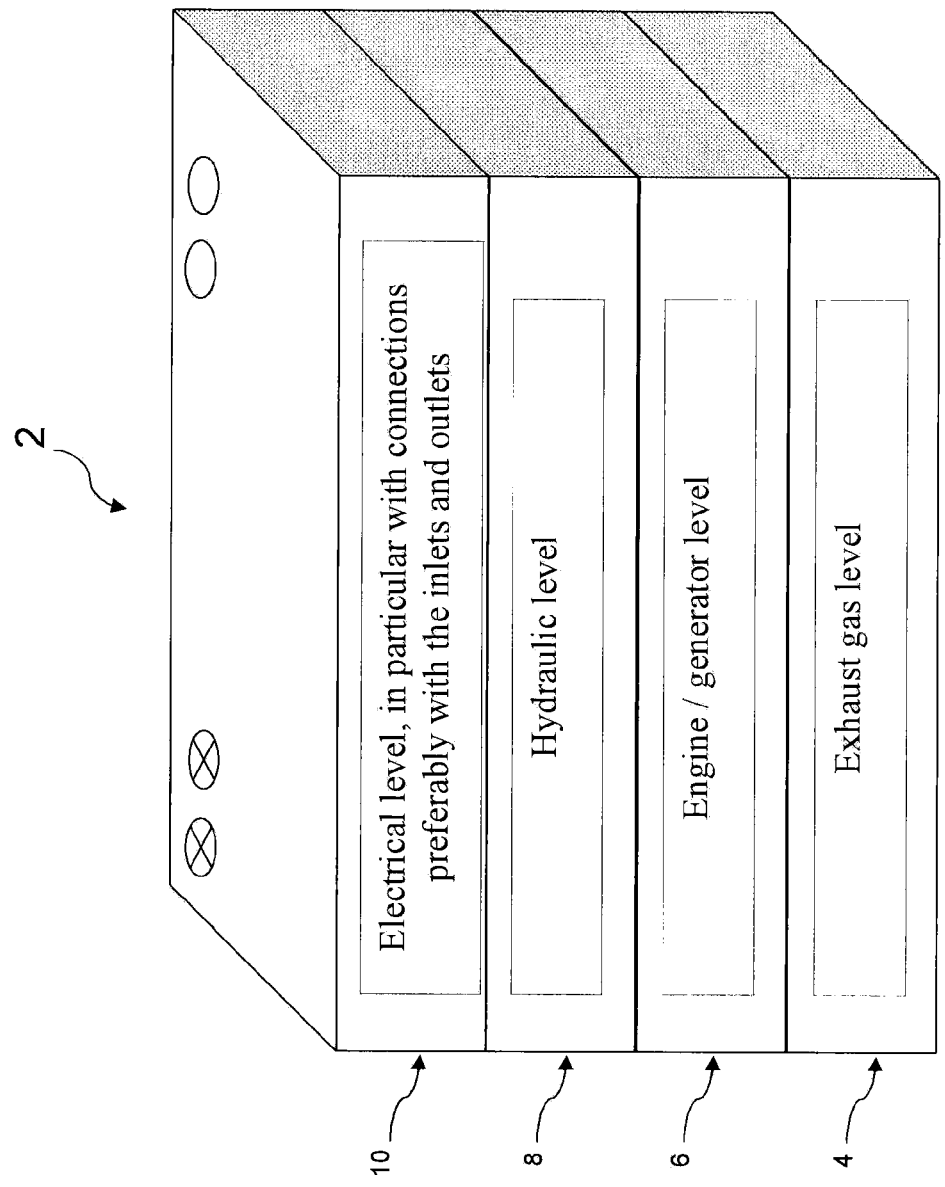
Figure 2A:
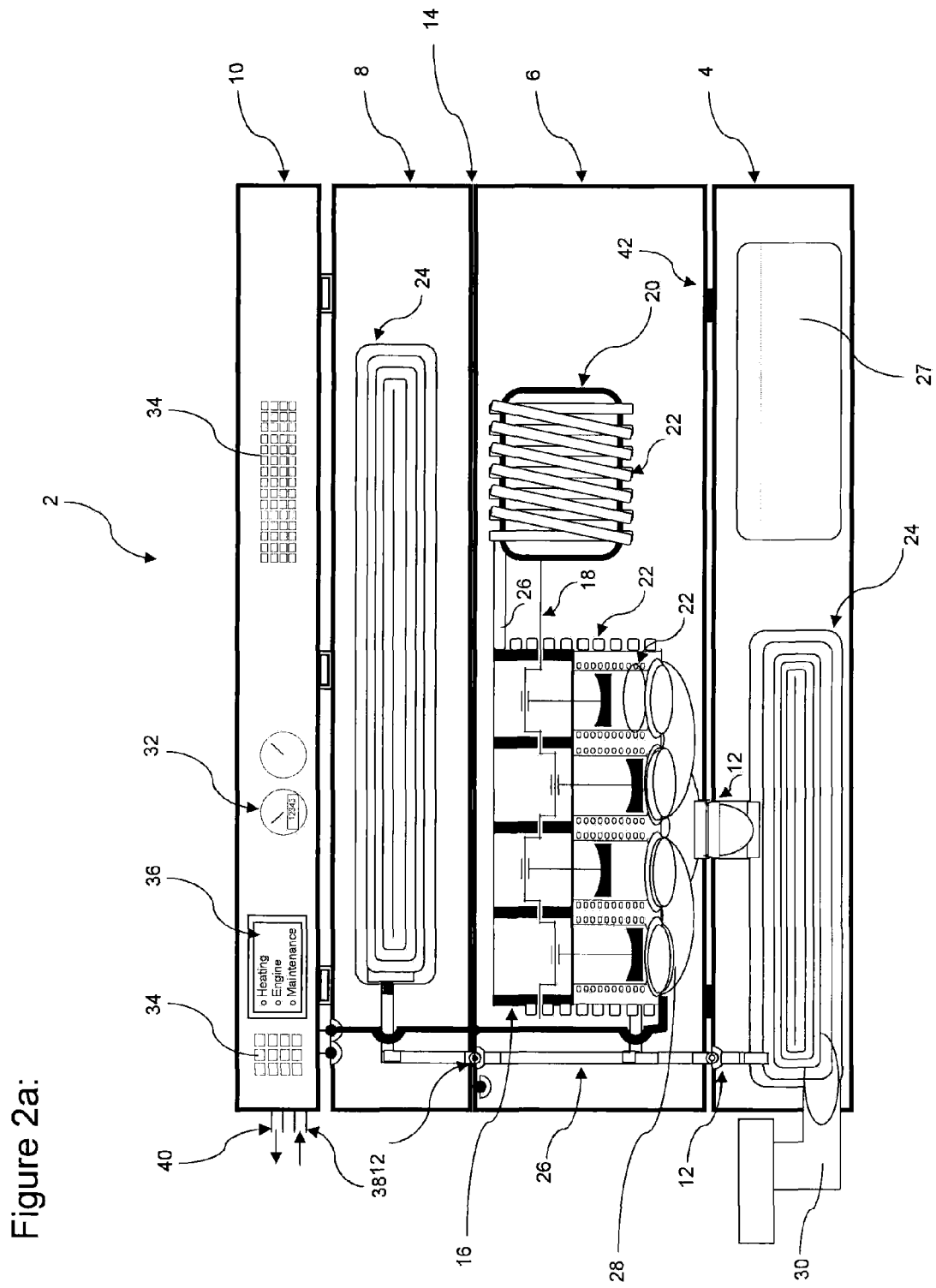
Figure 2B:
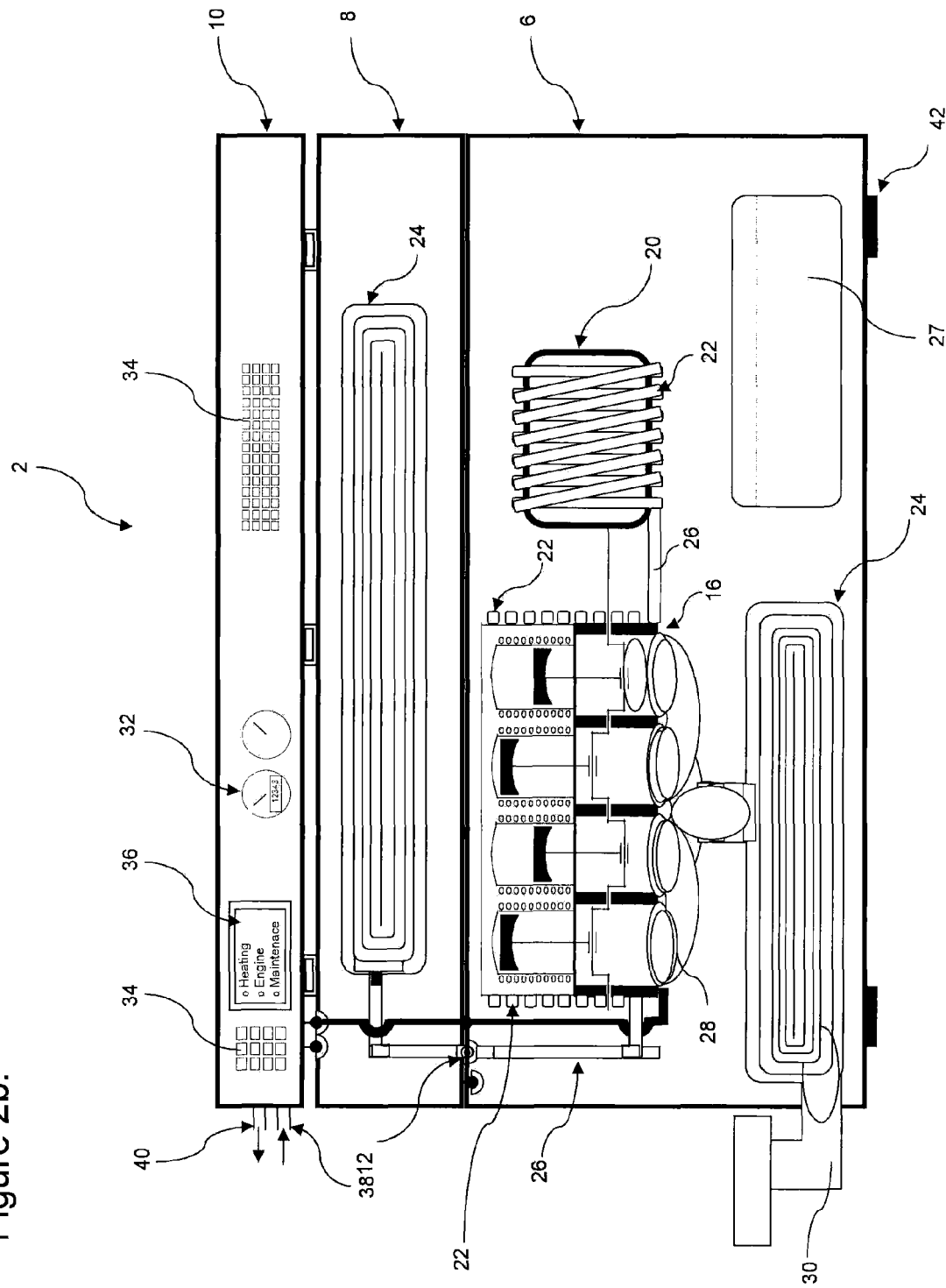
Figure 2C:
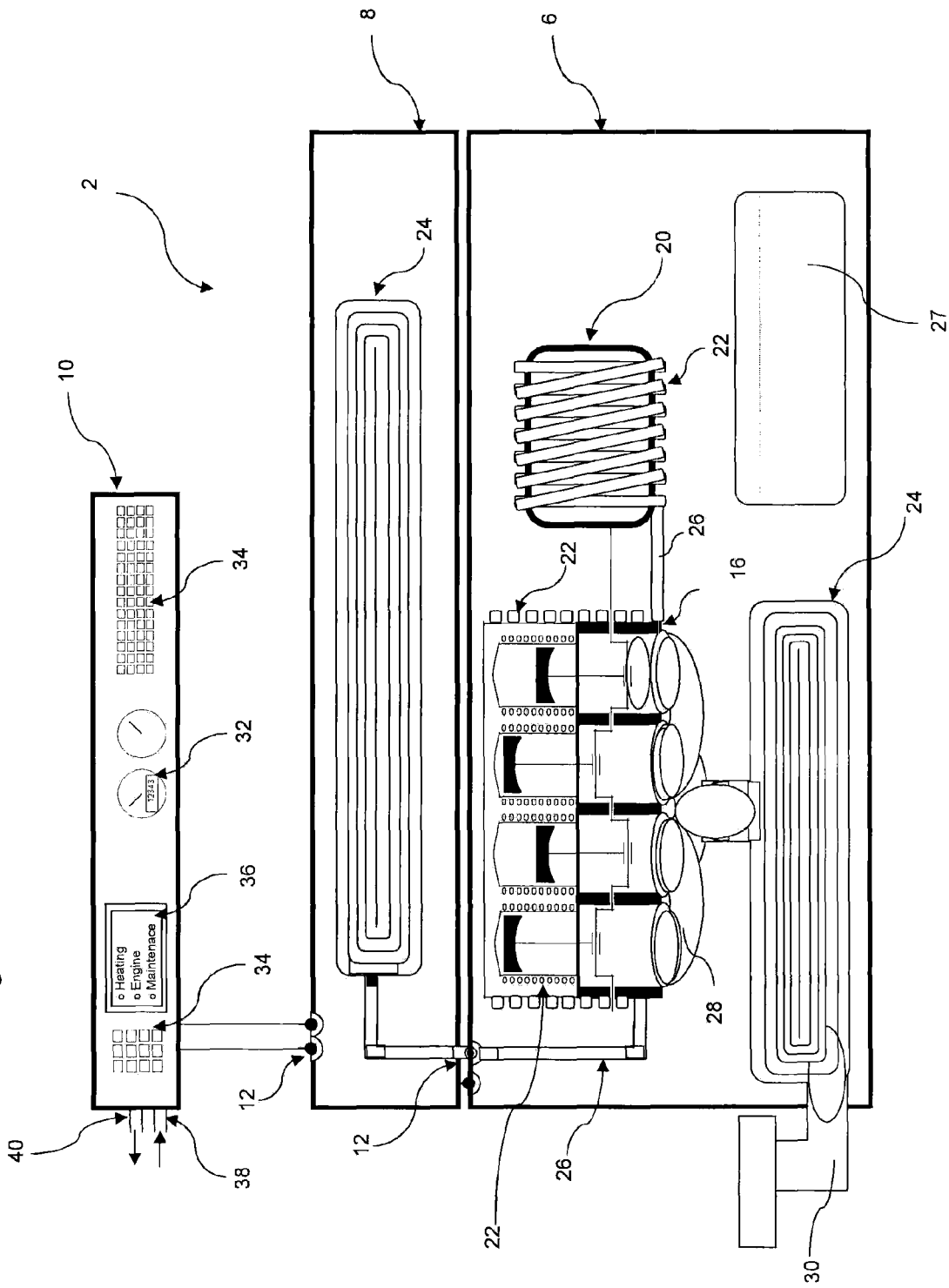
Figure 3A:
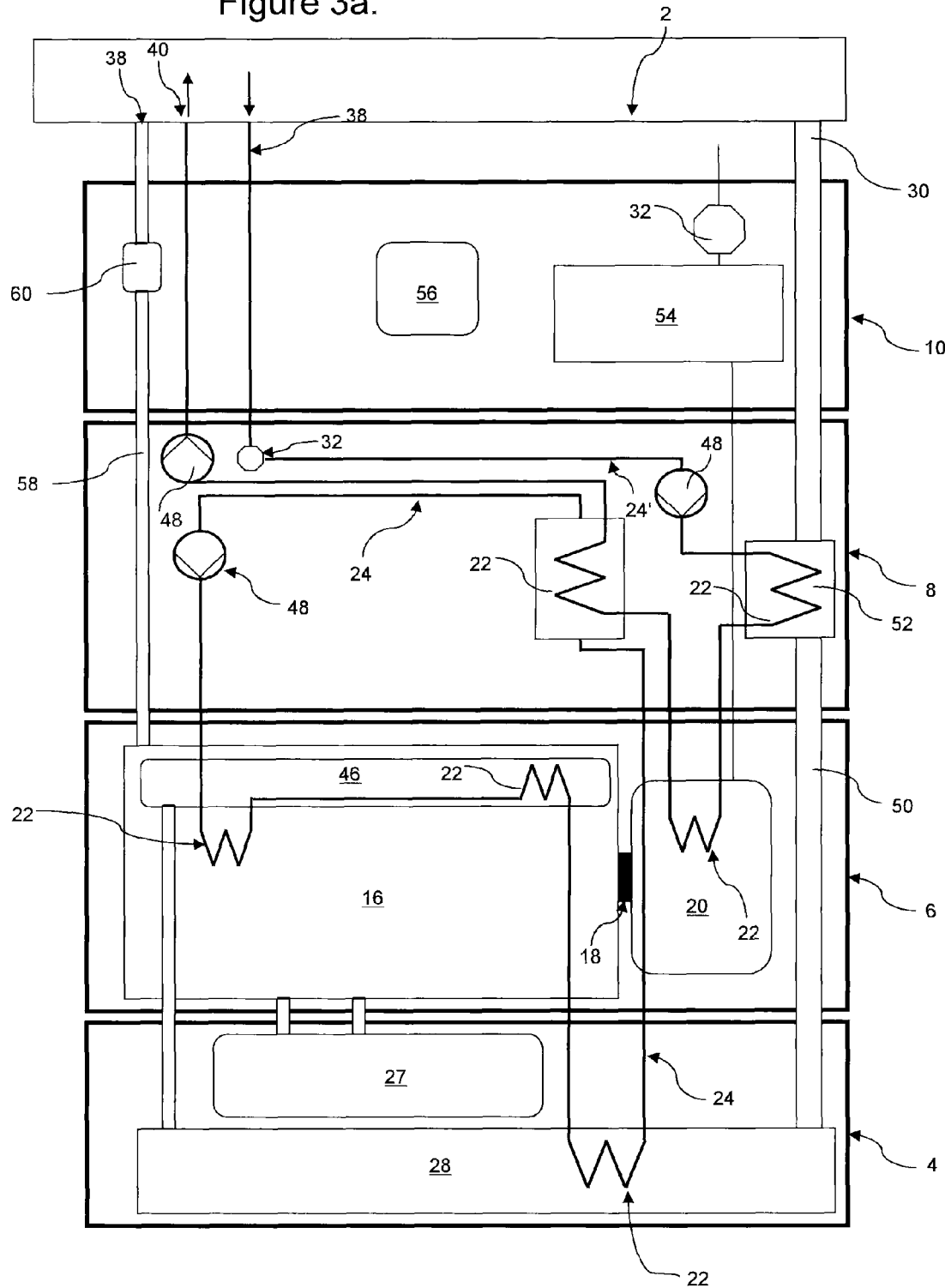
Figure 3B:
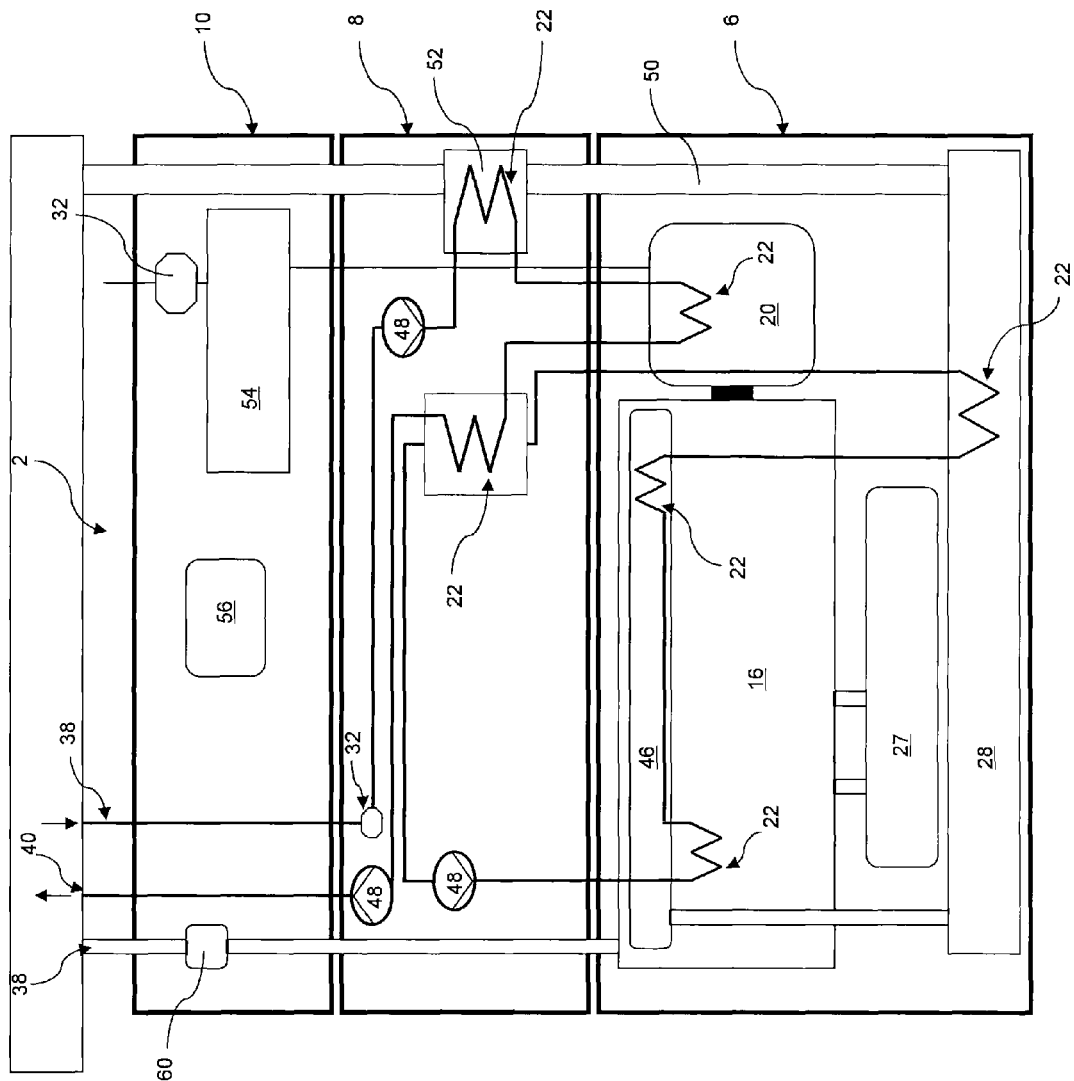
Figure 4:
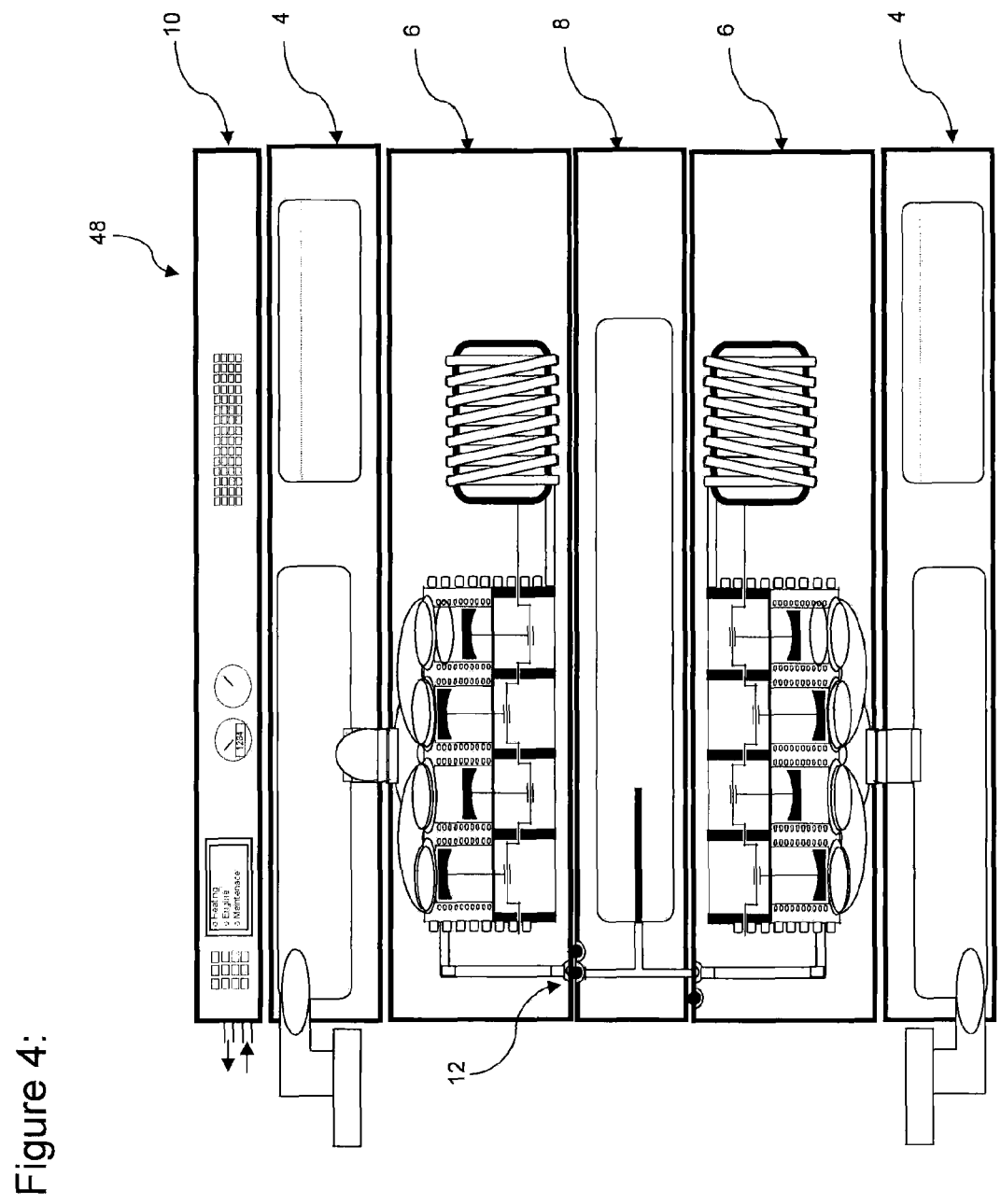

These and further features and advantages of the invention will be described in more detail with reference to the attached drawings of exemplary embodiments of the present invention, in which:

FIG. 1a shows an outline of the modular design of the communal heating and power station, FIG. 1b shows a schematic breakdown of a modular communal heating and power station, FIG. 2a shows a modular design of a heating and power station according to the invention, FIG. 2b shows an alternative modular design of a heating and power station according to the invention, FIG. 2c shows another modular design of a heating and power station according to the invention, FIG. 3a shows a, design of a communal heating and power station according to the invention, FIG. 3b shows another design of a communal heating and power station according to the invention, and FIG. 4 shows a system formed from modules according to the invention.

FIG. 1a shows a schematic layout of a modular communal heating and power station (2) according to the invention. A fourth module (4) is arranged as a module at the bottom, and has the at least one cooling circuit. This cooling circuit may, in particular, have inlets and outlets by means of which the module can preferably be connected to another module. Furthermore, in the schematic layout shown in FIG. 1, the fourth module (4) has a heat exchanger, as well as an oil tank (27), in particular an oil reservoir tank, which can be connected by means of connecting elements, in particular inlets and outlets, to the internal combustion engine in a first module (6). The fourth module is connected to the first module (6) by means of the connecting elements (12) according to the invention, in particular bidirectionally.

The first module (6) has the at least one internal combustion engine. The internal combustion engine may have inlets and outlets, in particular a fuel supply, preferably natural gas, and an outlet for exhaust gas. In one alternative embodiment, the first module (6) has a generator. In one preferred embodiment, the first module (6) has at least one internal combustion engine and one generator. The first module (6) has connecting elements (12) to a fourth module (4) and to a second module (8).

The second module (8) has the at least one cooling circuit, preferably with inlets and outlets. Furthermore, the second module (8) in the schematic layout shown in FIG. 1 has a heat exchanger and pumps, in particular for the cooling circuit. The second module (8) has connecting elements, by means of which it is connected to other modules, in particular to a first module (6) and/or to a third module (10).

A third module (10) has at least one control system, a meter, control devices and displays in particular as well as inputs and outputs of the communal heating and power station.

The contact surfaces (14) of the modules are designed such that the modules are mounted on one another and/or grip one another. The contact surfaces have the connecting elements (12), in particular plug connectors and/or coupling elements, such as multiple couplings (12').

FIG. 1b shows a schematic breakdown of a modular communal heating and power station according to the invention. In this case, as in FIG. 1a as well, the modular communal heating and power station comprises a first module (6), a second module (8), a third module (10) and a fourth module (4). At the same time, the communal heating and power station can be broken down into different areas, by virtue of the modular design according to the invention. The first module (6) therefore forms an engine/generator level, in particular on which the internal combustion engine and/or the generator are/is located. Elements of the at least one cooling circuit are located on a level above this, the hydraulic level, in particular formed by a second module (8). In particular, the connections and/or the inlets and outlets of the communal heating and power station, preferably all the connections and/or inlets and outlets of the communal heating and power station, can also be located on the uppermost level of the communal heating and power station, the electrical level. The uppermost levels of the modular communal heating and power station according to the invention are formed in particular from a third module (10). FIG. 1b furthermore shows a lower level, in particular formed from a fourth module (4). The lower level, the exhaust gas level, may in particular have elements of an exhaust gas installation and parts of the at least one cooling circuit. The lower level of the modular communal heating and power station is formed in particular by a fourth module (4).

FIG. 2a shows a modular design of a modular communal heating and power station (2) according to the invention. In this case, the modular communal heating and power station comprises a first module (6), a second module (8), a third module (10) and a fourth module (4), with the respective modules (4, 6, 8, 10) being connected by means of connecting elements (12). The first module (6) has an internal combustion engine (16). The internal combustion engine (16) is connected to a generator (20) via a shaft (18). The generator (20) in this case converts mechanical movement energy, in particular the rotary movement of the shaft (18) produced in the internal combustion engine (16). In FIG. 2, the internal combustion engine (16) has elements for heat transmission (22), which are connected to the at least one cooling circuit (24). The generator is also connected via a hydraulic connection (26), preferably an armored hose, to the at least one cooling circuit (24). The generator likewise has elements for heat transmission (22), which are connected to the at least one cooling circuit (24). The internal combustion engine (16) has elements of an exhaust gas installation (28), which are connected to the at least one cooling circuit (24), in particular to the cooling circuit of the fourth module.

The combustion gases from the engine can be supplied, in particular after they have been cooled down via an exhaust-gas connecting stub (30), to an external exhaust air system, in particular to a chimney (not shown).

The waste heat which is created by the engine during operation of the communal heating and power station can be transmitted through the elements for heat transmission (22) to the at least one cooling circuit (24). The first module (6) is connected to the second module (8) by means of connecting elements (12) via a hydraulic connection (26), in particular via an armored hose.

The second module (8) has the at least one cooling circuit (24), which carries away the waste heat from the internal combustion engine (16) via a coolant, in particular a fluid coolant, preferably water. The heated coolant is supplied to a third module (10), in particular via a hydraulic connecting element (12).

The third module (10) has means for measurement and meters (32), which preferably measure the fuel consumption and the amount of heat that is produced and/or emitted. The meters (32) may be both in an analog form and in a digital form. Furthermore, the third module (10) has at least one control system, in particular a control system for at least one of the components, in particular the engine and/or the generator, or individual modules and/or the entire modular communal heating and power station, and/or a connected heating installation. This control system can be adjusted by means of control elements (34). In addition, the third module (10) may have a plurality of control elements (34). The third module (10) preferably has at least one display (36), which preferably has touch-sensitive areas, in particular a touch-pad. In one preferred embodiment, the third module has at least one inlet (38), in particular for the fuel for the engine (16), and/or one outlet (40), in particular for the heated coolant, preferably water.

The contact surfaces (14) between the modules (4, 6, 8, 10) can preferably be designed such that the modules are positioned one above the other and/or grip one another. The modules according to the invention may (4, 6, 8, 10) have installation profiles (42, 44), in particular stand feet (42) and/or mounting rails (44). Each of the modules in FIG. 2 is connected to a directly adjacent connecting module by means of a complementary connecting element (12).

FIG. 2b shows an alternative modular design of a modular communal heating and power station (2) according to the invention. Different from FIG. 2a, the modular communal heating and power station consists of a first module (6), which comprises elements of an exhaust gas installation (28) and elements of the at least one cooling circuit (24), and a second module (8).

FIG. 2c shows an alternative modular design of a modular communal heating and power station (2) according to the invention. Different from FIGS. 2a and 2b the at least one control system, in particular a control system for at least one of the components, in particular the engine and/or the generator, or individual modules and/or the entire modular communal heating and power station is located apart from the first and second module.

FIG. 3a shows one preferred layout of a modular communal heating and power station (2). The modular communal heating and power station likewise comprises a first module (6), a second module (8), a third module (10) and a fourth module (4).

In addition to the internal combustion engine (16), the first module (6) contains a generator (20). The two components are connected via at least one shaft (18). The internal combustion engine has at least one heat-transmitting element (22) and an exhaust-gas manifold (46) with a heat-transmitting element (22). These heat-transmitting elements are each connected to the at least one cooling circuit (24), preferably to one and only one cooling circuit, and in particular to a primary cooling circuit. The cooling circuit may have at least one pump (48). The internal combustion engine (16) is also connected via at least one supply line and at least one outlet line to an oil tank and/or an oil reservoir extension (27). The oil tank (27) and/or the oil reservoir extension (27) are/is preferably accommodated in the fourth module. An exhaust gas installation (28) can likewise preferably be accommodated in the fourth module, in particular with an exhaust gas silencer and a heat exchanger (22). The exhaust gas installation (28) is preferably connected to an exhaust gas system (50) which, in particular, passes through all four modules (4, 6, 8, 10). In one particularly preferred embodiment, an additional heat exchanger (22), in particular a calorific value heat exchanger, is located in the second module, which heat exchanger preferably transmits the waste heat from the exhaust gas by means of a pipe bundle heat exchanger (52) to the at least one cooling circuit (24), particularly preferably a second cooling circuit, in particular a secondary cooling circuit (24'). This cooling circuit, preferably the secondary cooling circuit, likewise has at least one pump (48), and preferably at least two pumps. In addition, the at least one cooling circuit may have at least one meter (32), preferably at least one heat amount meter.

In FIG. 3, the third module (10) has at least one control unit (54), which is preferably connected to a communication element (56). The communication element (56) may, in particular, have a transmitter and a receiver for data interchange. The third module may also have at least one meter (32). In addition, for example, the gas path (58) may have control elements (60) and/or meters. The third module preferably has all the inlets (38) and/or outlets (40) and/or connections, in particular at least one connection to a low-voltage power supply system (62) or to a chimney via an exhaust-gas connecting stub (30).

In particular, the third module may have at least one inlet (38) for a heating system which can be connected, and/or one inlet (38), preferably a second inlet, for a drinking water connection. The at least one cooling circuit, in particular each cooling circuit, preferably the cooling circuit which is connected to the drinking water connection or to the heating connection, in each case preferably also has an outlet (40) via which, in particular, a liquid which has been heated in the communal heating and power station, preferably heating water or drinking water, is fed into a consumer system.

In addition, in one preferred refinement, the third module has a gas connection, that is to say an inlet (38) for the gas path (58).

FIG. 3b is analogous to FIG. 2b.

FIG. 4 shows a system (46) comprising communal heating and power station modules (4, 6, 8, 10) according to the invention. The illustrated system has two first modules (6), which are each connected to a fourth module (4) and to a second module (8), in particular to a common second module (8). In addition, the system has a third module (10), which contains at least one control system. The modules (4, 6, 8, 10) are connected to one another by means of connecting elements (12).

The invention claimed is:

1. A modular heating and power station comprising:
an electrical generator;
a first module comprising an internal combustion engine;
a second module comprising elements of a cooling circuit;
a third module comprising a central control unit which controls the heating and power station; and
a fourth module comprising an exhaust gas installation and further elements of the cooling circuit, wherein:
the modules are electrically and/or hydraulically connected using complementary quick-action connecting elements to assemble the station;
each module is individually pre-fabricated and is independently replaceable in the station with a separate or alternative module of the same type;
each module has a maximum weight of 330 kg; and
the maximum space required to install the station is 4 square meters.

2. The modular heating and power station according to claim 1, wherein the generator is located in the first, second, third, or fourth module, or in a fifth module.

3. The modular heating and power station according to claim 1, wherein each of the modules has a frame and the modules fit together for assembly of the station.

4. The modular heating and power station according to claim 1, wherein each of the modules has feet, mounting rails, or both, for assembly of the station.

5. The modular heating and power station according to claim 1, wherein the connecting elements are independently selected from the group consisting of quick-action plug connections and screw connections.

6. The modular heating and power station according to claim 1, wherein the modules are pre-fabricated and have a complementary shape and/or are positioned next to one and form a single unit.

7. The modular heating and power station according to claim 1, wherein the cooling circuit cools the internal combustion engine, the electrical generator, or both, and wherein the cooling circuit transmits heat energy from the internal combustion engine, the generator, or both, to another module.

8. The modular heating and power station according to claim 7, wherein the cooling circuit transmits heat energy to the third module.

9. The modular heating and power station according to claim 1, wherein the control unit controls the internal combustion engine, the generator, or both, and optionally one or more measurement apparatuses for measuring input variables, output variables, or both.

10. The modular heating and power station according to claim 1, wherein the third module further comprises a display unit.

11. The modular heating and power station according to claim 1, wherein the third module further comprises hydraulic inputs or outputs, electrical inputs or outputs, or combinations thereof, of the station.

12. The modular heating and power station according to claim 1, wherein the third module further comprises a meter for monitoring electrical and/or heat energy generated by the station.

13. The modular heating and power station according to claim 1, wherein the third module further comprises a meter for monitoring the consumption of electrical energy, fuel, or both.

14. The modular heating and power station according to claim 1, wherein the exhaust gas installation in the fourth module directs exhaust gas from the internal combustion engine, and the cooling circuit in the fourth module transmits heat from the exhaust gas from the internal combustion engine to another module.

15. The modular heating and power station according to claim 1, wherein the cooling circuit transmits heat to the second and/or third module.

16. The modular heating and power station according to claim 1, further comprising one or more elements selected from the group consisting of:
- a heat meter;
- a control system for the modular heating and power station;
- a control system for a heating system comprising the station;
- a heating control system for a plurality of optional heating circuits in an electrical distribution system;
- a communication unit;
- a mixing unit for a heating circuit;
- a mixing unit for a hot water heater;
- a storage booster pump;
- a circuit for engine preheating;
- a billing-related electricity meter; and
- a device for power supply system monitoring with associated switching elements.

17. The modular heating and power station according to claim 1, wherein the third module is connected to the second module, the second module is connected to the first module, and the first module is connected to the fourth module, wherein the modules are connected using complementary quick-action connecting elements.

18. The modular heating and power station according to claim 1, wherein the station comprises a plurality of like modules which are connected to one another.

19. A system comprising the modular heating and power station according to claim 1, wherein the modules are electrically and/or hydraulically connected to one another.

20. The modular heating and power station according to claim 1, wherein each module of the station has a maximum weight of 180 kg.

21. The modular heating and power station according to claim 1, wherein the maximum space required to install the station is less than 1 square meter.

* * * * *